(12) United States Patent
Neibert

(10) Patent No.: US 12,411,397 B1
(45) Date of Patent: Sep. 9, 2025

(54) CABLE PROTECTOR AND SECUREMENT SYSTEM

(71) Applicant: Dana Neibert, Coronado, CA (US)

(72) Inventor: Dana Neibert, Coronado, CA (US)

( * ) Notice: Subject to any disclaimer, the term of this patent is extended or adjusted under 35 U.S.C. 154(b) by 158 days.

(21) Appl. No.: 18/511,812

(22) Filed: Nov. 16, 2023

(51) Int. Cl.
*G03B 17/56* (2021.01)
*H01R 13/58* (2006.01)

(52) U.S. Cl.
CPC ....... *G03B 17/561* (2013.01); *H01R 13/5804* (2013.01)

(58) Field of Classification Search
CPC .............................................. G03B 17/56–566
See application file for complete search history.

(56) References Cited

U.S. PATENT DOCUMENTS

| | | | |
|---|---|---|---|
| 7,559,788 B2 | 7/2009 | Legg | |
| 8,907,216 B2 | 12/2014 | Backus et al. | |
| 10,962,865 B2 * | 3/2021 | Ujiie | G03B 17/561 |
| 11,269,239 B2 | 3/2022 | Johnson, Sr. et al. | |
| 11,619,866 B2 | 4/2023 | Johnson, Sr. et al. | |

FOREIGN PATENT DOCUMENTS

WO  WO-2024119920 A1 *  6/2024 ............. G03B 17/56

OTHER PUBLICATIONS

Smallrig product page for "HDMI and USB-C Cable Clamp for EOS R5 & R6 &R5 C Cage 2981" at https://www.smallrig.com/smallrig-hdmi-and-usb-c-cable-clamp-for-eos-r5-r6-r5-c-cage-2981.html , archive.org copy dated Sep. 12, 2022 (Year: 2022).*
Tether Block product page at https://www.tethertools.com/product/tetherblock/ , archive.org copy dated Oct. 12, 2017 (Year: 2017).*
Newshooter article titled "Tilta ES-T17-A V2 cage for Sony a7, a7 II, a7 III & a9 review" at https://www.newsshooter.com/2019/01/24/tilta-es-t17-a-v2-cage-for-sony-a7-a7-ii-a7-iii-a9-review/ (Year: 2019).*

* cited by examiner

*Primary Examiner* — Leon W Rhodes, Jr.
(74) *Attorney, Agent, or Firm* — Plager Schack LLP; Mark H. Plager; Naomi Mann

(57) ABSTRACT

A cable protector and securement system comprising a cable protector device configured attach to a camera for preventing a connector of a cable from becoming unintentionally disconnected from camera and/or damaged when the cable is installed to camera. In certain embodiments, the cable protector device may include a cable securing cartridge configured for securement of the cable in a manner which restrains movement of the cable, and a cable connector protector coupled to the cable securing cartridge.

11 Claims, 3 Drawing Sheets

CABLE PROTECTOR AND SECUREMENT SYSTEM

BACKGROUND

The present disclosure relates generally to camera cable protection systems.

Photographers may typically use tether cables, (typically long USB cables) to connect their camera to a computer, for example, for seeing live images from their camera on the computer screen in real time. However, such tether cables are expensive and subject to easily becoming damaged. Moreover, the tether cable can easily disconnect from the camera during normal use. The As such, there is a need for an improved system that addresses these issues.

SUMMARY

According to various embodiments, disclosed is a cable protector and securement system comprising a cable protector device configured attach to a camera for preventing a connector of the cable from becoming unintentionally disconnected from camera and/or damaged when the cable is installed to camera. In certain embodiments, the cable protector device may include a cable securing cartridge configured for securement of the cable in a manner which restrains movement of the cable, and a cable connector protector coupled to the cable securing cartridge. In certain embodiments, the cable connector protector includes at least one wall configured to shield the connector of the cable when the connector is plugged into a connector receiving port of the camera, and when the cable protector device is attached to the camera.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
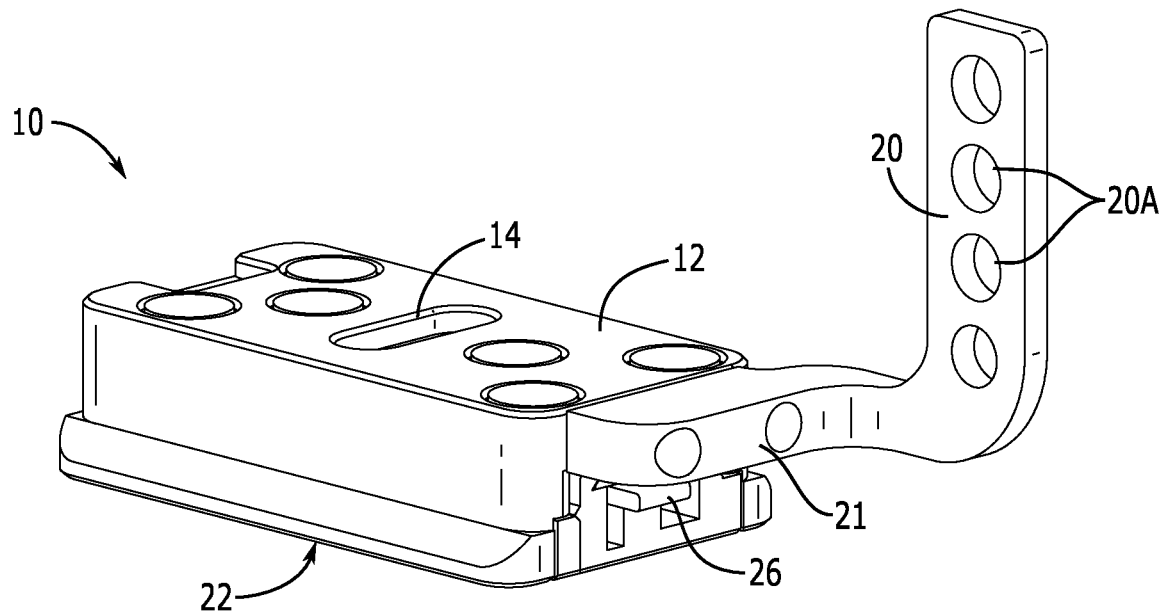
FIG. 1 is a side perspective view of a cable protector device of a cable securement system, the device comprising a cable securing cartage and a cable connector protector, according to various embodiments.
Figure 2:
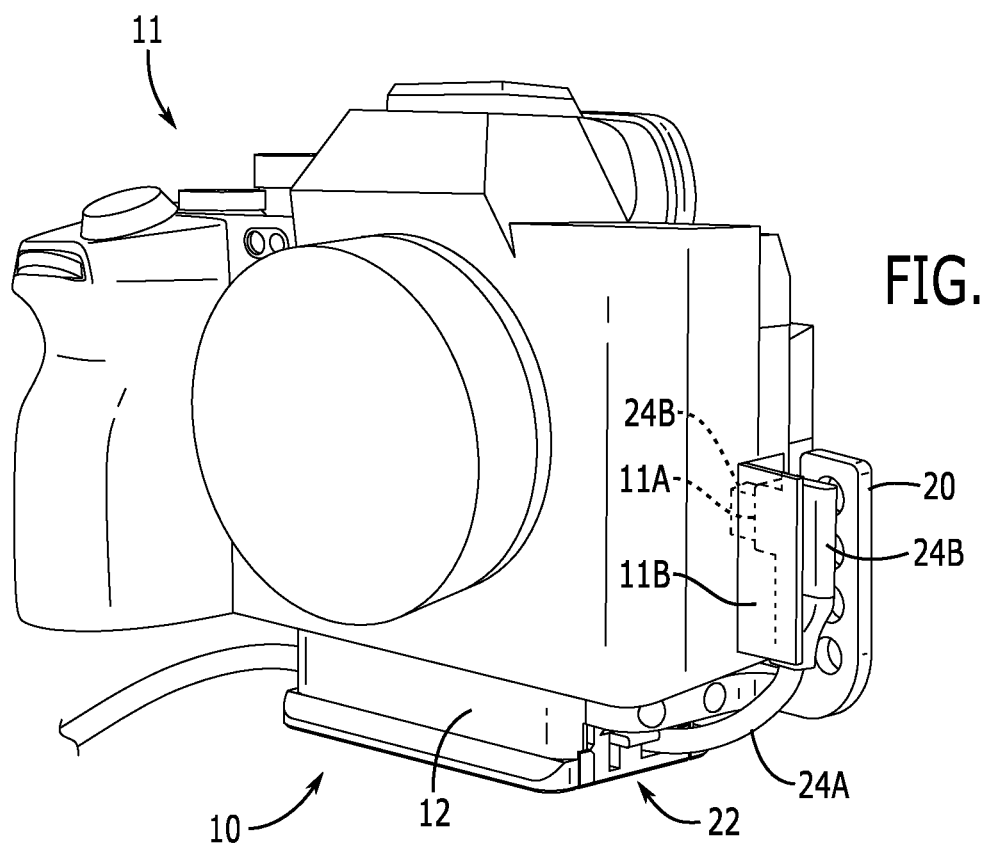
FIG. 2 is a front perspective view showing the protector device of FIG. 1 attached to a camera, and in use for protection of a cable installed to the camera according to various embodiments.
Figure 3:
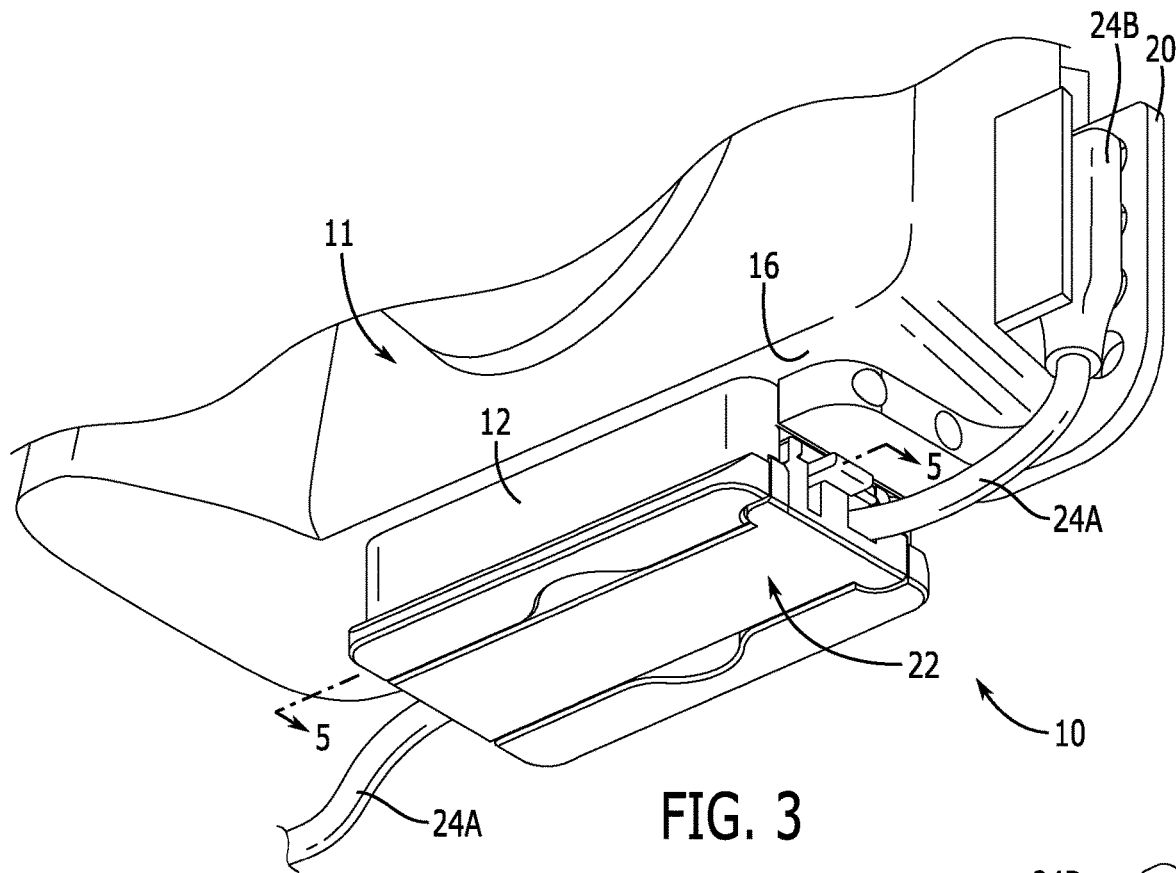
FIG. 3 is an enlarged detailed bottom perspective view of the protector device and camera, shown in FIG. 2.
Figure 4:
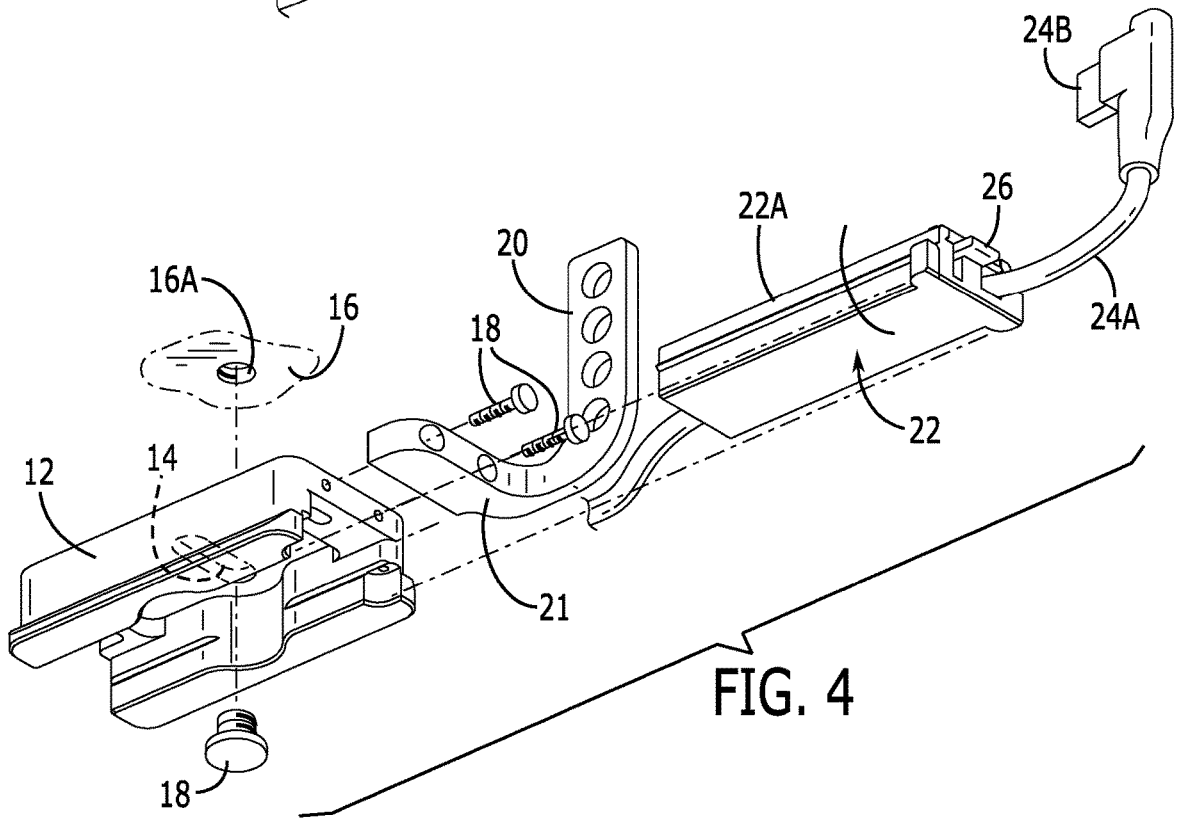
FIG. 4 is a bottom exploded view of the protector device with cable secured thereto, according to various embodiments.
Figure 5:
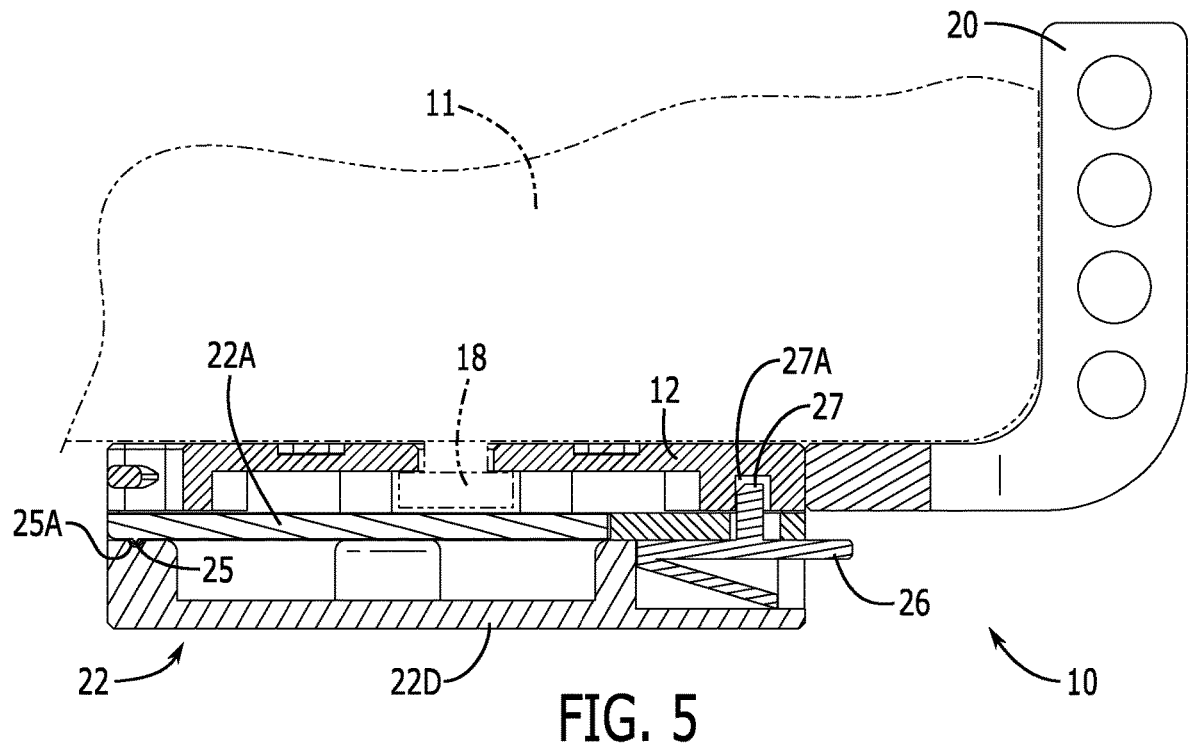
FIG. 5 is a detail cross-sectional view on line 5-5 of FIG. 3.

According to various embodiments as depicted in FIGS. 1-6 disclosed is a cable protector and securement system comprising a cable protector device 10 configured attach to a camera 11 for preventing a connector 24B of a cable 24A from becoming unintentionally disconnected from camera 11 and/or damaged when cable 24A is installed to camera 11. In certain embodiments, cable 24A may be a USB and/or data cable with connector 24B being a USB plug and/or data cable plug, but is not limited to these options. Cable 24A is installed to camera 11 by plugging connector 24B into a connector receiving port 11A of the camera.

In certain embodiments, device 10 comprises a cable securing cartridge 22 configured to secure cable 24A to camera 11. In further embodiments, device 10 comprises a cable connector protector 20 which includes at least one wall configured to shield cable connector 24B when plugged into the connector receiving port 11A. In certain embodiments, cable connector protector 20 and cable securing cartridge 22 are coupled to one another. As such, device 10 prevents connector 24B from detachment and/or damage by preventing cable 24A from being pulled, while shielding connector 24B from impact.

In certain embodiments, an extension arm 21 is provided between cable securing cartridge 22 and cable connector protector 20. Extension arm 21 is configured to position cable connector protector 20 proximate connector receiving port 11A of the camera, such that the cable connector protector 20 creates at least one shielding wall alongside connector 24B when connector 24B is plugged in. In certain embodiments, device 10 is configured to mount to an underside wall 16 of camera 11, wherein connector receiving port 11A is provided on a side of the camera extending substantially perpendicular to the underside wall of the camera. As such, arm 21 positions cable connector protector 20 in a substantial perpendicular alignment to cable securing cartridge 22. This allows cable 24A to extend around adjacent walls of camera 11 while held in place via cable securing cartridge 22 for optimal stability.

In some embodiments, device 10 is configured to mount to underside wall 16 of camera 11 via a camera mounting plate 12. In some embodiments, cartridge 22 may be releasably attachable to the mounting plate, as will be described. In certain embodiments, extension arm 21/cable connector protector 20 is an attachment component of the mounting plate 12. In one embodiment, mounting plate 12 may be attached to underside wall 16 via fastener(s) 18 (i.e., screws) engaged through at least one mounting plate slot 14 and a corresponding internally threaded screw hole 16A in camera underside wall 16. In further embodiments, extension arm 21 of cable protector 20 may be assembled to mounting plate 12 via fasteners 18 engaged through corresponding slots and screw holes in arm 21 and plate 12, respectively (see FIG. 4). In other embodiments, mounting plate 12 and extension arm 21/cable protector 20 may be an integral unit.

In certain embodiments, connector protector 20 comprises an elongated plate which is sized and structured to shield connector 24B along a first major side face of connector 24B, as shown. In some embodiments, connector protector 20 may include one or more openings 20A, for heat dissipation, but not necessarily so. In some embodiments, camera 11 may include a port tab 11B configured to extend along a second major side face opposite the first side face of connector 24B when connector 24B is plugged in, wherein connector protector 20 is configured to position opposite port tab 11B with respect to connector receiving port 11A. As such, connector protector 20 forms a protective trench for connector 24B in conjunction with port tab 11B. It shall be appreciated that while cable connector protector 20 is illustrated as including a single elongated plate, other shielding structures may be provided in alternate embodiments depending on factors such as the camera design, user and/or manufacturer needs, user and/or manufacturer preferences, etc. For example, in a camera not including port tab 11B, connector protector 20 may include multiple shielding walls for protectively surrounding connector 24B.

Figure 6:
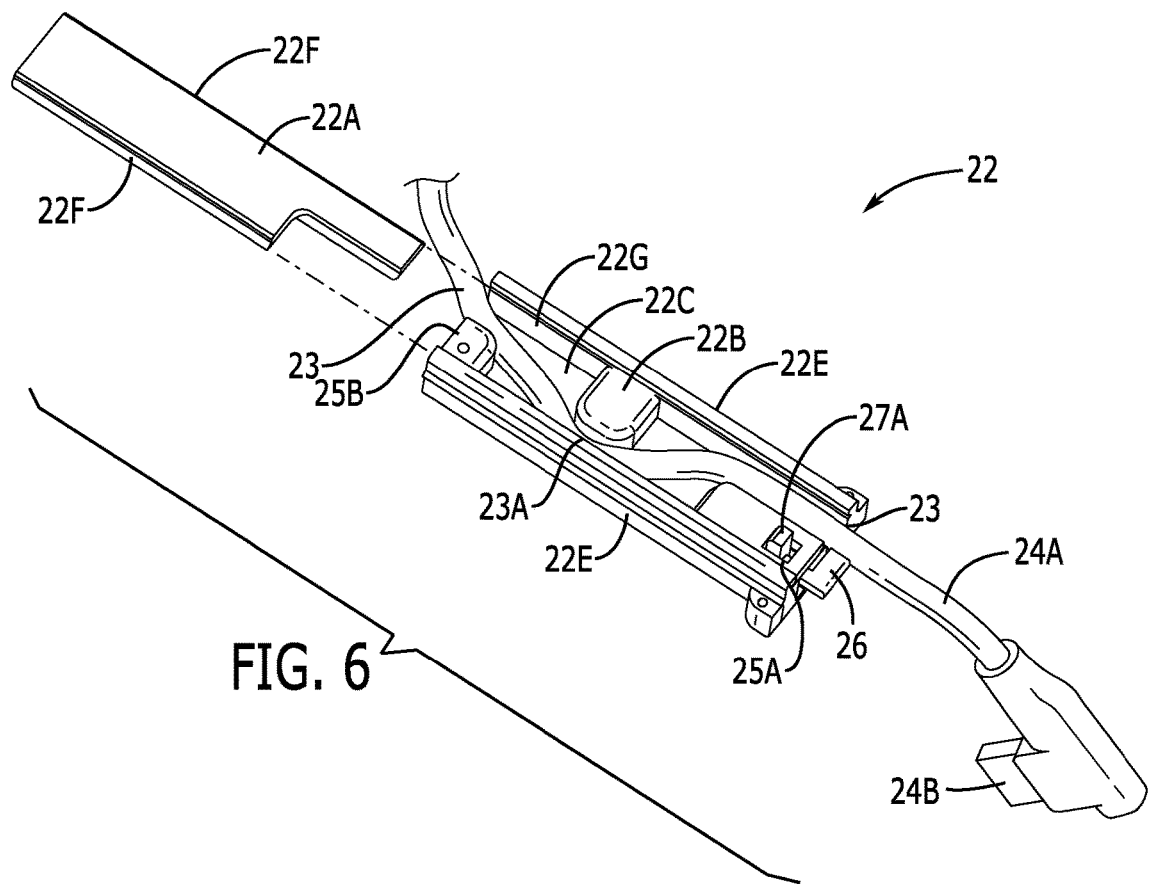
FIG. 6 is an exploded perspective view of the cable securing cartridge of the cable protector device, according to various embodiments.

In embodiments, cable securing cartridge 22 is configured to hold cable 24A in place and prevent the cable from sliding or shifting within cartridge 22. In further embodiments cartridge 22 is configured to releasably attach to mounting plate 12. In some embodiments as best depicted in FIG. 6, cartridge 22 may comprise a main body including bottom wall 22D and side walls 22E extending upwards from bottom wall 22D to define a hollow passage space 22C through which cable 24B may pass. In some embodiments, the main body of cartridge 22 may be generally planar. In some further embodiments, the main body of cartridge 22 may also be elongated as depicted in the figures, but not necessarily so. In further embodiments, front and rear knobs 25A, 25B may form partial front and rear walls of the cartridge with constricted openings 23 leading into space 22C. In some embodiments, cartridge 22 may further comprise a cover 22A configured to releasably attach over side walls 22E and knobs 25A, 25B, opposite bottom wall 22D to enclose space 22C. In one embodiment, cover 22A may include side tabs 22F configured to slidable engage with recessed tracks 22G provided on an inner side of side walls 22E. In further embodiments, a bottom side of cover 22A may include a bump 27 configured to engage within a receiving dimple 25A on a top side of rear knob 25B for guiding the lateral position of the cover. As such, cover 22A may be easily attachable and detachable component of cartridge 22.

In certain embodiments, constricted openings 23 provide entrance and exit points for the cable 24B into and out of passage space 22C, as shown. Additionally, at least one internal cable engagement knob 22B is provided within passage space 22C, and defines an internal cable constricting zone 23A within the cartridge. In further embodiments, constricted openings 23 and cable constricting zone 23A provide a passage space slightly larger than the cable's diameter, to allow the cable to pass yet restrict its radial (i.e., traverse) movement. Additionally, cable constricting zone 23A is transversely offset from constricted openings 23 forcing cable 24A to take a crooked path within cartridge 22. This further restricts the cables movement within the cartridge by increasing frictional forces against lateral movement. As such, cable 24A is restricted from shifting into and out of cartridge 22, and is effectively secured within cartridge when cover 22A is installed.

In some embodiment, cartridge 22 is configured to securely and releasably attach to mounting plate 12 when cartridge 22 is enclosed via cover 22A. In one embodiment, cartridge 22 may comprise a latched peg 27 configured to lockably engage to a latch receiving cavity 27A formed at a top side of mounting plate 12. In some embodiments, latched peg 27A may extend from a top side opening within front knob 25A, and may further include a release lever 26 extending from a front side opening of front knob 25A, as shown. In some embodiments, cover 22A includes a cutout section which leaves latched peg 27A exposed at the top surface of cartridge 22. Release lever 26 is configured to cause latched peg 27 to pull frontwards and disengage from latch receiving cavity, upon depression of release lever 26. As such, cartridge 22 may be coupled to camera 11/mounting plate 12, and released therefrom via latched peg 27A and release lever 26.

As such, a user may initially install device 10 to camera 11 by screwing mounting plate 12 to the underside wall of camera 11. This positions cable connector protector 20 alongside cable port 11A. In some embodiments, cable connector protector 20 may be attached to mounting plate 12 via fasteners/screws prior to installation of the plate to the camera. In other embodiments, cable connector protector 20 may be pre-attached to mounting plate 12. Thereafter, device 10 may be used to secure cable 24A anytime the cable is installed to the camera, without additional hardware or tools needed. In some embodiments, device 10 may be pre-attached to camera 11.

With mounting plate 12 installed to camera 11, the user may insert cable 24A into cartridge 22 and plug cable connector 24B into cable port 11A of the camera. In some embodiments, cartridge 22 may first be removed from mounting plate 12 and cover 22A may be removed from cartridge 22. Cable 24A may then be inserted into cartridge 22 and snaked around knobs 25A, 22B, and 25B. Cover 22A may then be closed over cartridge 22, and the cartridge may be attached to the mounting plate with cable connector 24B plugged into connector port 11A before or after attachment of the cartridge. The resulting assembly keeps the cable securely weaved into the cartridge and the cable connecter protected.

Thus, the disclosed subject matter provides a tool-free system that prevents the cable from unintentionally disconnecting from the camera and also protects the fragile USB connector from damage.

It shall be appreciated that the disclosed device and system can have multiple configurations in different embodiments, and may be adapted for different camera designs in alternate embodiments. In certain embodiments, components of device 10 may be fabricated out of aluminum and/or plastic. It shall be appreciated, however, that device 10 may comprise any alternative known materials in the field and be of any color, size, and/or dimensions. It shall be appreciated that device 10 may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A cable protector device for protecting a cable attached to a camera, the cable protector device comprising:
a cable securing cartridge configured for securement of the cable in a manner which restrains movement of the cable;
a cable connector protector coupled to the cable securing cartridge, the cable connector protector comprising at least one wall configured to shield a cable connector of the cable when the cable connector is plugged into a connector receiving port of the camera and when the cable protector device is attached to the camera;
the cable securing cartridge comprising:
walls defining a hollow passage space through which the cable can be passed for securement of the cable;
a first constricted opening on a first side of the hollow passage space, the first constricted opening providing an entrance point for the cable to enter the hollow passage space;
a second constricted opening on a second side of the hollow passage space, the second constricted opening providing an exit point for the cable to exit the hollow passage space; an internal cable constricting zone within the hollow passage space; and
a cover configured to releasably attach over the hollow passage space, wherein the first constricted opening, the second constricted opening, and the cable constricting zone create a crooked passageway for the cable, when the cable is passed through the hollow passage space of the cartridge.

2. The cable protector device of claim 1, further comprising:
an extension arm between the cable securing cartridge and the cable connector protector, wherein the extension arm positions a long axis of the cable connector protector in a substantial perpendicular alignment to a long axis of the cable securing cartridge.

3. The cable protector device of claim 2, the extension arm being configured to position the cable connector protector proximate the connector receiving port of the camera when the cable protector device is attached to an underside wall of the camera with the connector receiving port being on a side of the camera extending substantially perpendicular to the underside wall of the camera, such that the cable connector protector creates at least one shielding wall alongside the cable connector when the cable connector is plugged into the cable connector receiving port.

4. The cable protector device of claim 1, further comprising a mounting plate configured to mount to the camera, wherein the cable connector protector is an attachment component of the mounting plate, and wherein the cable securing cartridge is configured to releasably attach to the mounting plate.

5. The cable protector device of claim 1, wherein the cartridge comprises an elongated planar body.

6. The cable protector device of claim 1, wherein the cartridge includes:
a bottom wall;
a first side wall extending upwards from the bottom wall;
a second side wall extending upwards from the bottom wall and opposite the first side wall;
a front knob between the first and second side walls, the front knob forming a partial front wall with said first constricted opening provided between said first side wall and said front knob;
a rear knob between the first and second side walls, the rear knob forming a partial rear wall with said second constricted opening provided between said first side wall and said rear knob; and
an internal knob provided within passage space, said internal knob forming said internal cable constricting zone between said internal know and said second side wall.

7. The cable protector of claim 6 wherein cover is configured to releasably attach over the first and second side wall, and the rear, front, and internal knobs, opposite the bottom wall.

8. The cable protector device of claim 1, further comprising a mounting plate configured to mount to the camera, wherein the cable securing cartridge is configured to releasably attach to the mounting plate.

9. The cable protector device of claim 8, the cable securing cartridge further include a latched peg coupled to a lever arm, the latched peg configured to securely latch to the mounting plate, and to disengage from the mounting plate via a release force on the lever arm.

10. The cable protector device of claim 1, wherein the cable protector device prevents the cable connector from detachment and/or damage by preventing the cable from being pulled, while shielding the cable connector from impact.

11. The cable protector device of claim 1, wherein the cable is a USB cable and/or data cable.

* * * * *